No. 640,605. Patented Jan. 2, 1900.
W. A. VAN DEUSEN.
COOKING UTENSIL.
(Application filed Apr. 21, 1899.)

(No Model.)

WITNESSES:
Edward Thorpe

INVENTOR
William A Van Deusen
BY
ATTORNEYS.

UNITED STATES PATENT OFFICE.

WILLIAM A. VAN DEUSEN, OF NEW YORK, N. Y.

COOKING UTENSIL.

SPECIFICATION forming part of Letters Patent No. 640,605, dated January 2, 1900.

Application filed April 21, 1899. Serial No. 713,941. (No model.)

*To all whom it may concern:*

Be it known that I, WILLIAM A. VAN DEUSEN, of the city of New York, borough of Brooklyn, in the county of Kings and State of New York, have invented a new and Improved Cooking Utensil, of which the following is a full, clear, and exact description.

One object of my invention is to provide a cooking utensil which will consist of a number of vessels capable of use either singly or collectively and in connection with which a single cover only need be employed.

A further object of the invention is to provide a simple and economic cooking utensil particularly adapted for steaming cereals, vegetables, custards, and puddings and to so construct the utensil that the steam will have access to the sides of the vessel in which the material is placed, from top to bottom of said vessel, insuring the material being cooked quickly yet thoroughly and evenly throughout.

I will describe a cooking utensil embodying my invention and then point out the novel features in the appended claim.

Reference is to be had to the accompanying drawings, forming a part of this specification, in which similar characters of reference indicate corresponding parts in both views.

Figure 1:
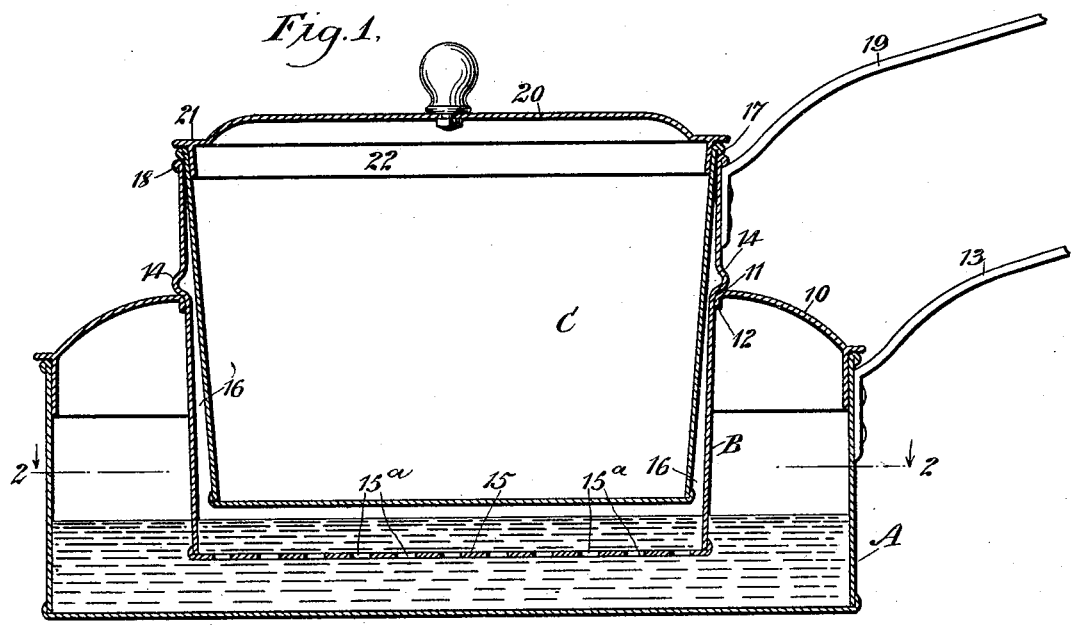
Figure 2:
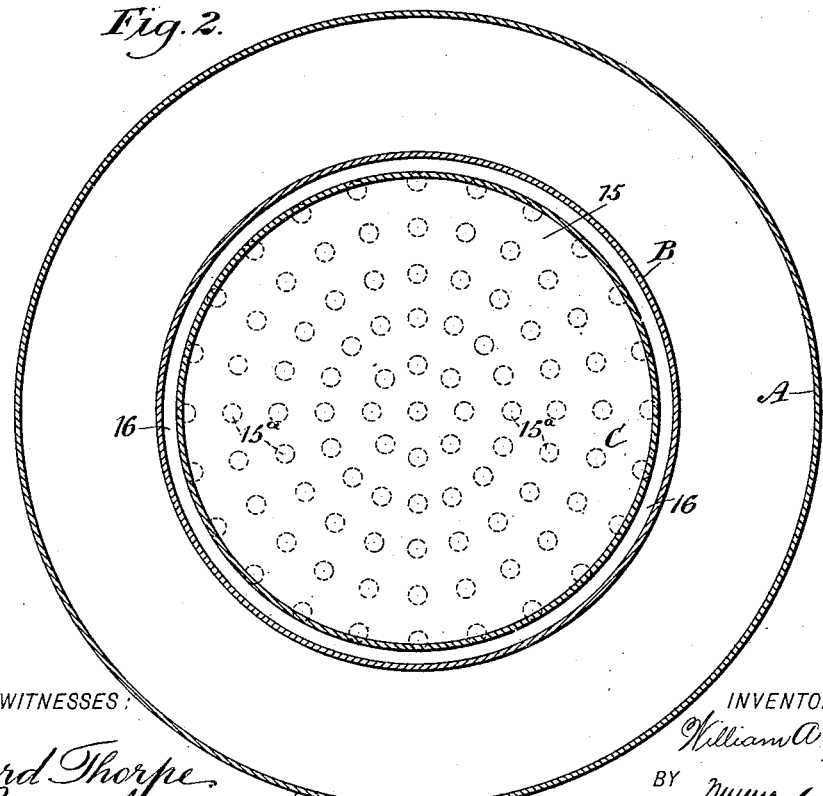

Figure 1 is a vertical section through the improved utensil, and Fig. 2 is a horizontal section taken practically on the line 2 2 of Fig. 1.

A represents a vessel of any desired dimensions, the vessel, however, being preferably cylindrical and provided with an open top. The top of the vessel, however, is adapted to be normally closed by a cover 10, which cover is provided with an opening 11, having a circular opening at its center, the opening being surrounded by a downwardly-extending flange 12, as is best shown in Fig. 1. The vessel A is, furthermore, provided usually with a handle 13.

A second vessel B, which is also preferably cylindrical, is used in connection with the vessel A, being introduced into the vessel A through the opening 11 in the cover 10. The vessel B is prevented from passing too far into the vessel A by forming a flange 14 on the exterior of the vessel B, which engages with the cover 10 adjacent to the opening 11. The vessel B is provided with a bottom 15, having perforations or recticulations 15ª.

A third vessel C is employed, the vessel C being adapted to hold the material that is to be steamed. The vessel C is preferably tapering, being narrowest at its bottom, and the vessel C is suspended within the intermediate vessel B, being held in place by forming a rib 17 at the top, which engages with a like rib 18, correspondingly located on the intermediate vessel B, as is also best shown in Fig. 1. A space intervenes the bottom of the vessel A and the bottom of the intermediate vessel B, and a like space intervenes the bottom of the vessels B and C, while a space 16 is obtained between the sides of the inner and the intermediate vessels.

The outer or main vessel A is adapted to hold water, and when this outer or main vessel is heated the steam will ascend and enter the space 16 between the sides of the intermediate and inner vessels and will heat the inner vessel uniformly from bottom to top, thus insuring a thorough cooking of any material placed therein. The cover 20 is provided with a horizontal flange 21 in addition to the usual vertical flange 22, and the horizontal flange 21 is of such dimensions that the cover may be utilized to close the top of any of the vessels.

The main vessel A may be used independently of the two other vessels, the cover 20 being employed as auxiliary to the cover 10, or the main vessel A and the vessel B may be used together, if desired, or the intermediate vessel may be used independently of either of the others.

Having thus described my invention, I claim as new and desire to secure by Letters Patent—

A cooking utensil, comprising an outer vessel adapted to receive water, a cover removably supported on said vessel and provided with a central circular opening and an inwardly-turned edge surrounding said opening, an intermediate cylindrical vessel inserted through said opening and having a perforated bottom and an annular flange adapted to engage with the said inturned edge whereby to support the vessel with its bottom spaced from the bottom of the outer vessel, an inner vessel of downwardly-tapering form fitted in the intermediate vessel and formed with a rib at its upper edge adapted to engage with the top of the intermediate vessel whereby to hold the inner vessel with its bottom spaced from the perforated bottom, and a cover having a horizontal flange of such width that the cover may be used on any of the vessels, as set forth.

WILLIAM A. VAN DEUSEN.

Witnesses:
J. FRED. ACKER,
JNO. M. RITTER.